(12) United States Patent
Horibata et al.

(10) Patent No.: US 6,678,226 B2
(45) Date of Patent: Jan. 13, 2004

(54) DATA RECORDING METHOD AND DATA RECORDING APPARATUS

(75) Inventors: Yoshihiro Horibata, Tokyo (JP); Norichika Mine, Tokyo (JP); Satoshi Kumai, Tokyo (JP)

(73) Assignee: Sony Corporation, Tokyo (JP)

( * ) Notice: Subject to any disclaimer, the term of this patent is extended or adjusted under 35 U.S.C. 154(b) by 32 days.

(21) Appl. No.: 10/168,529
(22) PCT Filed: Oct. 5, 2001
(86) PCT No.: PCT/JP01/08813
§ 371 (c)(1),
(2), (4) Date: Jun. 28, 2002
(87) PCT Pub. No.: WO02/29809
PCT Pub. Date: Apr. 11, 2002

(65) Prior Publication Data
US 2002/0191505 A1 Dec. 19, 2002

(30) Foreign Application Priority Data
Oct. 5, 2000 (JP) ........................................ 2000-306573

(51) Int. Cl.[7] ................................................. G11B 7/00
(52) U.S. Cl. ..................................... 369/47.3; 369/53.15
(58) Field of Search ............................ 369/47.3, 53.12, 369/53.13, 53.15

(56) References Cited

U.S. PATENT DOCUMENTS 4,375,088 A    2/1983   de Haan et al. ............... 369/44

FOREIGN PATENT DOCUMENTS

| JP | 6-131824 | 5/1994 | |
| JP | 10-149633 | 6/1998 | |
| JP | 11-25460 | 1/1999 | |
| JP | 2000-123509 | * 4/2000 | ................ 369/47.1 |
| JP | 3074183 | 6/2000 | |

* cited by examiner

Primary Examiner—Nabil Hindi
(74) Attorney, Agent, or Firm—Oblon, Spivak, McClelland, Maier & Neustadt, PC

(57) ABSTRACT

This invention relates to a data recording method or the like preferably being applicable to a case where it records data on an optical disc such as DVD+RW disc. When writing the data on block area A, if no normal write clock occurs correctly, it stops writing the data and performs replacement procedures on the area A. It then writes predetermined data on the area A using reference clock. It also records the data on next block area A+1 across the area A, thereby preventing the area A from generating blank portion therein on its rear side based on nonuniform rotation of the optical disc, etc. It records the data on the area A+1 using normal write clock. It then performs the replacement procedure on the area A+1. Thereby, it prevents the disadvantage such as a tracking servo failure in the areas A and A+1.

17 Claims, 11 Drawing Sheets

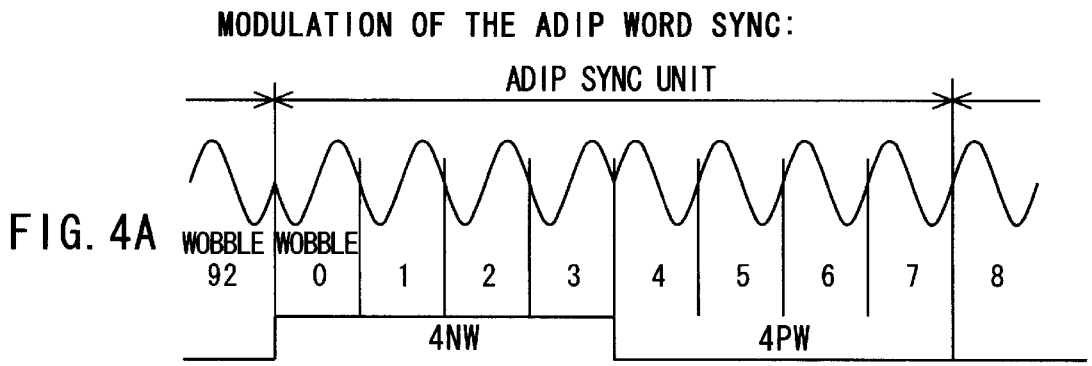
FIG. 4A  Modulation of the ADIP word sync
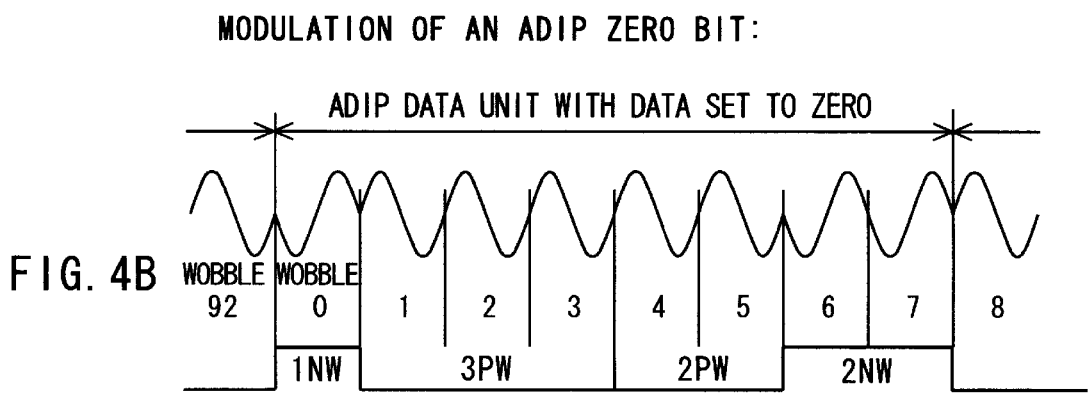
FIG. 4B  Modulation of an ADIP zero bit
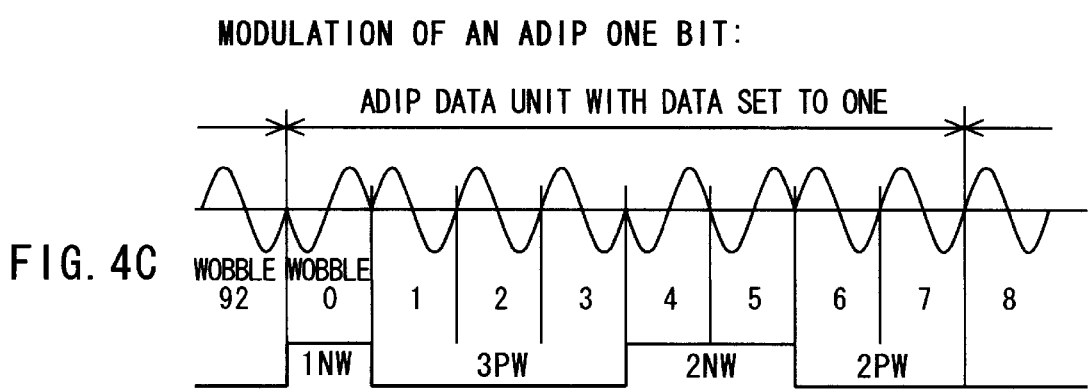
FIG. 4C  Modulation of an ADIP one bit

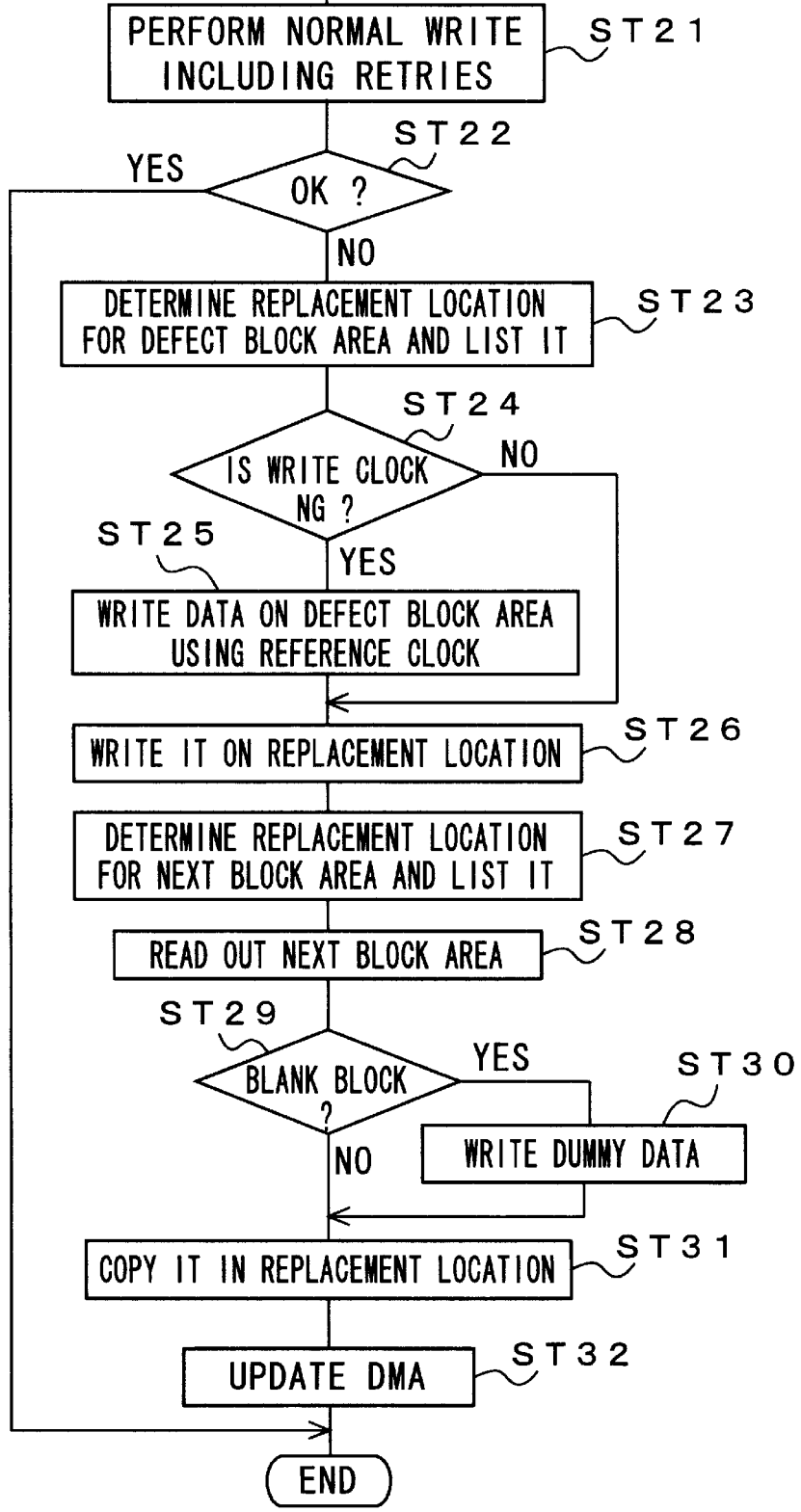

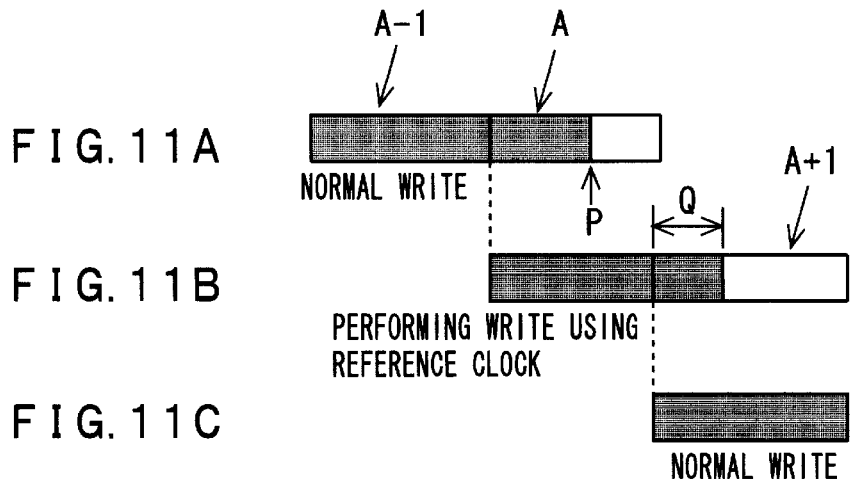
FIG. 11A
FIG. 11B
FIG. 11C
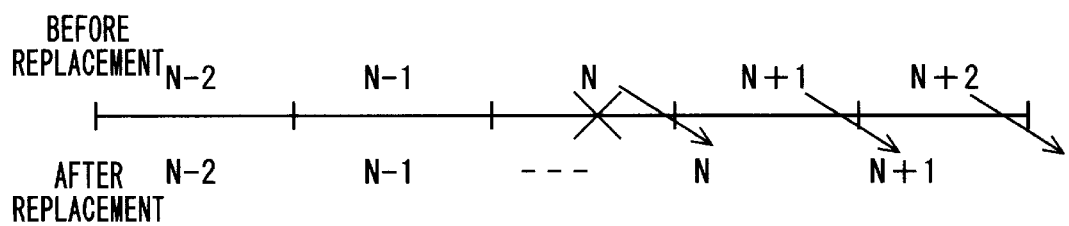
FIG. 12
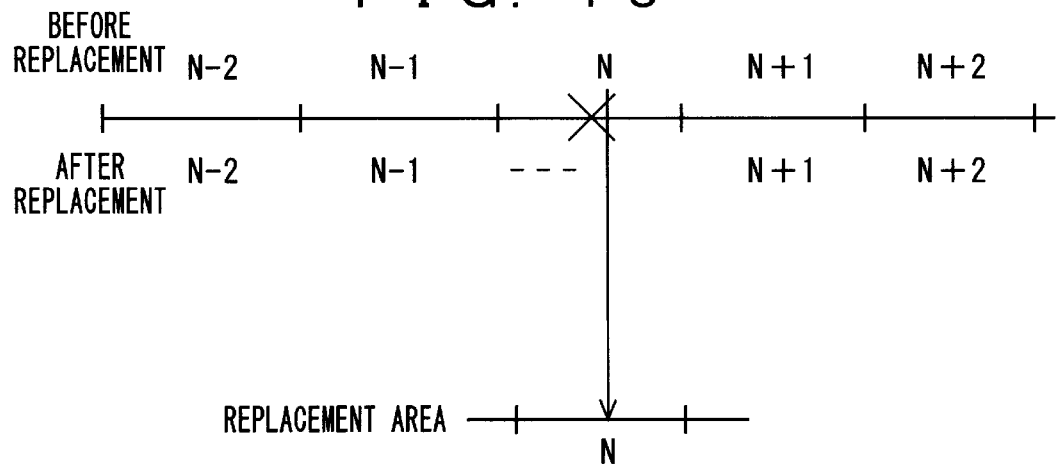
FIG. 13

DATA RECORDING METHOD AND DATA RECORDING APPARATUS

TECHNICAL FIELD

This invention generally relates to a data recording method and a data recording apparatus preferably being applicable to a case where it records data on an optical disc medium such as Digital Versatile Disc plus Rewritable (hereinafter called DVD+RW). More specifically, this invention relates to a data recording method and the like, wherein it records the data on the optical disc on a block unit basis using write clock generated on the basis of information given by the optical disc, with performing replacement procedures on a predetermined block area of the optical disc on which a predetermined block of data is to be recorded when the write clock corresponding to the predetermined block area fails to be correctly generated, and recording predetermined data using a reference clock that is different from the write clock, thereby preventing the predetermined block area from generating blank portion therein when performing the replacement procedures on the predetermined block area, and preventing disadvantage such as a tracking servo failure occurred in the predetermined block area when DVD-ROM drive or the like reproduces the optical disc.

BACKGROUND ART

In the DVD+RW disc, it has proposed that the data be recorded on a block unit basis. Here, one block unit indicates a recording block including an Error Correction Code (ECC). DVD+RW disc allows the data of one block unit to be recorded on its own one block area (including 16 sectors).

According to a format of the optical disc, defect management system is employed in general whereby if there is any defective block area, it performs the replacement procedures on the defective block area so that the optical disc is available for use without any problems.

When it, in particular, is formatted before using, a perfect certification allows any defective block area to be found. The defective block areas thus found are usually listed in the Primary Defect List (hereinafter called PDL) and it performs slip replacement as the replacement procedure on the defect areas as shown in FIG. 12. According to the slip replacement, the data to be recorded on the defective block area, if any, is recorded on a next block area that physically follows the defective block area. In FIG. 12, a reference number such as N−1, N, and N+1 indicates a number of the block.

The defective block areas found while using are listed in the Secondary Defect List (hereinafter called SDL) and it performs linear replacement as the replacement procedure on the defect area as shown in FIG. 13. According to the linear replacement, a replacement area to be replaced with the defective block area is selected in advance and if it finds any defective block area, the data to be recorded on the defective block areas is recorded on a block area in the replacement area. In FIG. 13, a reference number such as N−1, N, and N+1 indicates a number of the block.

Regarding DVD+RW with 3.0 GB capacity, the PDL and SDL are respectively recorded on Defect Management Area (hereinafter called DMA) set in the inner circle's Lead-in area or in the outer circle's Lead-out area, as shown in FIG. 14.

Regarding DVD+RW with 4.7 GB capacity, the defect management is simplified so that the defective block areas found while certification and using are recorded on Replacement List (hereinafter called RPL) as shown in FIG. 15. The RPL is equivalent to the above SDL. Therefore, according to the DVD+RW with 4.7 GB capacity, it performs only the linear replacement without performing the slip replacement. This produces merits of fixing an address of each of the block areas in spite of their replacement condition.

DVD+RW disc with 3.0 GB capacity has a format that is fairly different from a DVD-ROM format in a location of block area, presence of link sectors, presence of spear sectors in the data area and so on. The DVD-ROM drive, however, may reproduce the data from it by a simple change of its hardware and with its firmware referring to the PDL and/or SDL.

DVD+RW disc with 4.7 GB capacity gives top priority to compatibility with the DVD-ROM disc so that if the defective block area is not replaced by the replacement procedure, we can consider it to be compatible with the DVD-ROM disc. Even if the replacement occurs, the compatibility may be accomplished with a support of the firmware like DVD-ROM drive refers to the RPL.

In order for the DVD-ROM drive to reproduce the DVD+RW disc as the ROM, it retrieves a tracking error signal using Differential Phase Detection (hereinafter called DPD) method. According to the DPD method, the tracking error signal is detected on the basis of pits so that a blank portion may cause the tracking servo failure, and thus, this fails to access the subsequent block areas again. This also causes a lot of retries according to a firmware configuration. On the other hand, the DVD+RW drive records it on blank block areas and retrieves the tracking error signal from pre-groove using Differential Push Pull (hereinafter called DPP) method.

The DVD-ROM drive also retrieves address information from an ID stored on a top of each of the sectors in reproduction data. It is necessary, in order to retrieve the ID from a first sector of each of the block areas, that a reproduction RF signal is retrieved from a block area just before the same to lock Phase-Locked Loop (hereinafter called PLL) by which reproduction clock (read clock) is obtained and the IDs are correctly retrieved during a previously predetermined section for checking uninterruption of the addresses. Although, regarding DVD+RW drive, methods of retrieving the address information are fairly different from each other according to the DVD+RW disc with 3.0 GB capacity or 4.7 GB capacity, it may retrieve the information from Address in Pre-groove (hereinafter called ADIP) included in a wobble of the pre-groove according to either of the discs.

Therefore, regarding the DVD+RW disc, the followings are required for it to be compatible with the DVD-ROM in a physical level: no blank portion remains (of course, with the exception of the portion that is not necessary at all for being accessible thereto); and IDs can be retrieved during a previously predetermined section from a block area just before a block area recording the necessary data.

Accordingly, an object of the invention is to provide a data recording method and so on for preventing the predetermined block area of the optical disc from generating blank portion therein when performing the replacement procedures on the predetermined block area and preventing the disadvantage such as a tracking servo failure occurred in the predetermined block area when reproducing the optical disc.

DISCLOSURE OF THE INVENTION

According to the invention, we provide a data recording method for recording data on an optical disc on a block unit basis using write clock generated on the basis of information given by the optical disc, comprising performing replacement procedures on a first block area of the optical disc on which a predetermined block of data is to be recorded, when the write clock corresponding to the first block area fails to be correctly generated, and recording predetermined data on the first block area using a reference clock that is different from the write clock.

We also provide a data recording apparatus comprising write clock generating means for generating write clock on the basis of information given by an optical disc, data recording means for recording data on a block unit basis using the write clock generated by the write clock generating means, reference clock generating means for generating reference clock that is different from the write clock, and processing means for performing replacement procedures on a first block area of the optical disc on which a predetermined data block is to be recorded, when the write clock generating means fails to generate the write clock corresponding to the first data block area correctly, and allowing the data recording means to record predetermined data on the first block area using the reference clock generated by the reference clock generating means.

Further, we provide a data recording apparatus comprising write clock generating means for generating write clock on the basis of information given by reflected light from an optical disc, data recording means for recording data using the write clock generated by the write clock generating means, reference clock generating means for generating reference clock that is different from the write clock, and processing means for allowing the data recording means to record predetermined data on the first block area using the reference clock generated by the reference clock generating means when the write clock generating means fails to generate the write clock correctly corresponding to the first block area of the optical disc on the basis of the information given by the reflected light from the optical disc, during certifying process.

According to these inventions, the write clock is generated on the basis of the information given by the optical disc on the recording. It is illustratively generated either according to the PLL on the basis of the reproduction signal of Alternating Fine Clock Mark (hereinafter called AFCM) if the optical disc is DVD+RW disc with 3.0 GB capacity, or according to the PLL on the basis of the wobble signal if the optical disc is DVD+RW disc with 4.7 GB capacity.

On the recording, the optical disc usually allows the data to be recorded thereon on a block unit basis using the write clock thus generated. For example, the block indicates one ECC block constituting 16 sectors.

During such the recording, the replacement procedures are performed on the first block area of the optical disc on which a predetermined data block is to be recorded, when the write clock corresponding to the first data block area fails to be correctly generated. For example, when disturbing a reproduction signal of AFCM or a wobble signal, the PLL is unlocked so that no write clock can occur correctly.

As described above, the data recording is carried out on the first block area using the reference clock, a fixed clock that is different from the write clock when performing the replacement procedures on the first block area.

This prevents the predetermined block area from generating blank portion therein when performing the replacement procedures on the first data block area and prevents tracking servo failure occurred in the first data block area when a drive gets a tracking error signal on the basis of recorded pits (marks).

When it records the data using the above write clock on a second block area following the first block area that has recorded the data using such the reference clock, a clock component of the reproduction RF signal is interrupted across the boundary between the first and the second block areas so that the PLL may be unlocked and no reproducing clock (read clock) occurs correctly at the top of the second block area with a fear of failing to reproduce the data from the second block area. In order to avoid this, it will be enough if the replacement procedures are also performed on the second block area.

Further, even if the replacement procedures are performed on the second block area, the clock component of the reproduction RF signal is uninterrupted across the boundary between the second block area and a third block area following the second block area when normal write, which uses the write clock generated on the basis of the information given by the optical disc, is performed on the second block area, thereby correctly generating the reproducing clock on the third block area from which the data can be correctly retrieved.

When it records the data on the first block area using the reference clock as described above, there can remain a blank portion in a rear side of the first block area if a predetermined amount of the data to be recorded on the first block area is recorded on the first block area because the reference clock fails to be adapted for nonuniform rotation of the optical disc, etc. If there remains a blank portion in the first block area, this causes the tracking servo failure in the first block area. For this reason, when recording the data on the first block area using the reference clock, it will be better to record the data on the second block area across the first block area. This is implemented by increasing an amount of the data to be recorded or reducing a frequency of the reference clock.

BRIEF DESCRIPTION OF DRAWINGS

FIGS. 4A through 4C are diagrams each illustrating a unit constituting ADIP word in the DVD+RW disk with 4.7 GB capacity;

FIG. 10 is a flow chart illustrating a process in normal write;

FIGS. 11A through 11C are diagrams each illustrating a blank-free writing method;

FIG. 12 is a diagram illustrating slip replacement procedures;

FIG. 13 is a diagram illustrating linear replacement procedures;

BEST MODE FOR CARRYING OUT THE INVENTION

Figure 1:
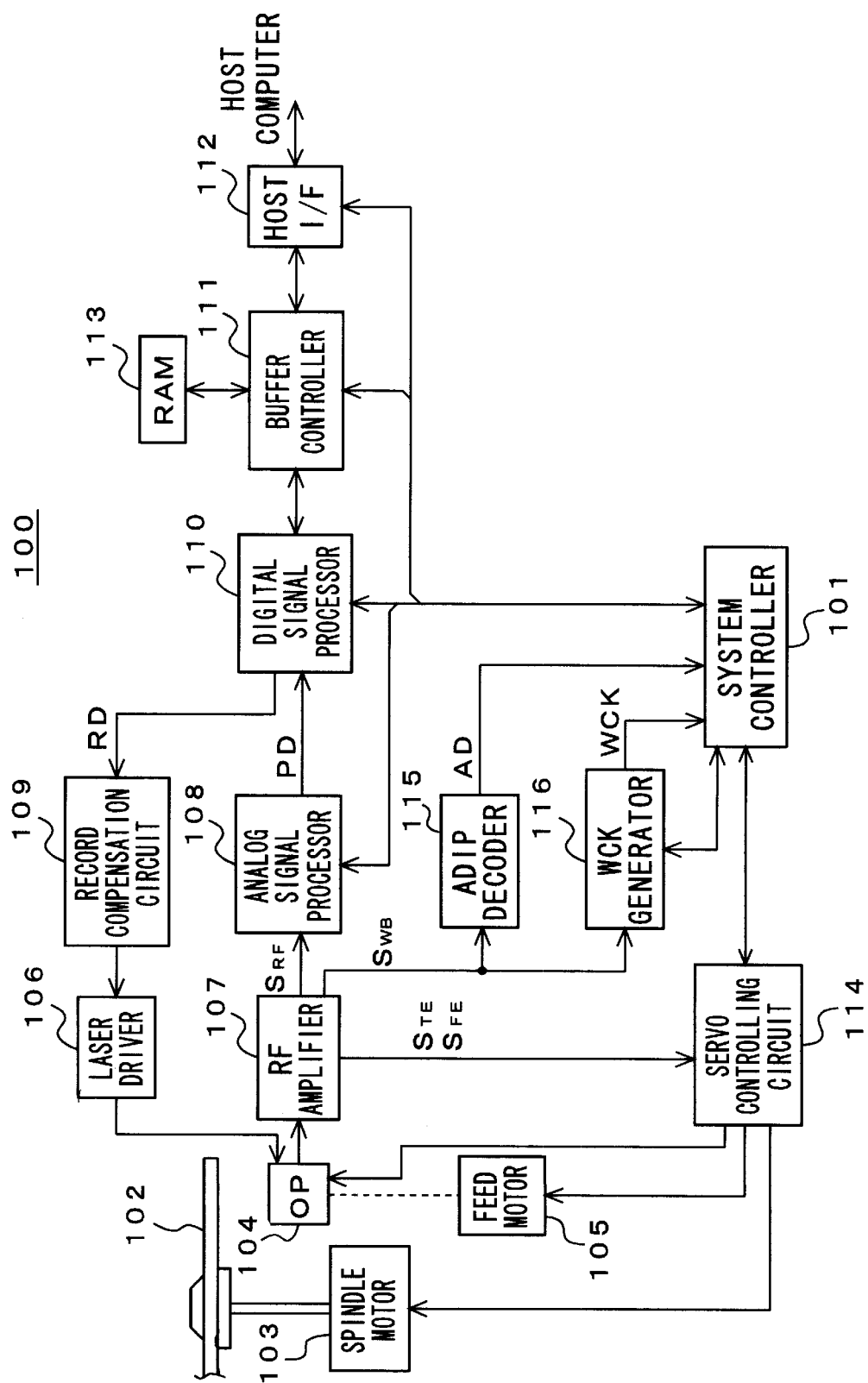
FIG. 1 is a block diagram showing a configuration of optical disc drive.

Referring to the drawings, the preferred embodiments of the invention will be explained more in detail. FIG. 1 shows a configuration of the optical disc drive 100 handling the DVD+RW disc. This drive 100 may handle the DVD+RW disc with 3.0 GB capacity or 4.7 GB capacity. The drive 100 comprises a system controller 101 including Central Processing Unit (hereinafter called CPU) for controlling operation of an entire system thereof.

Optical disc 102 (DVD+RW disc) being handled with the driver 100 arranges a groove, not shown, that spirals on its data record surface so that the data can be recorded or reproduced according to the groove as a track. The groove slightly wobbles and records address information thereon.

Figure 2:
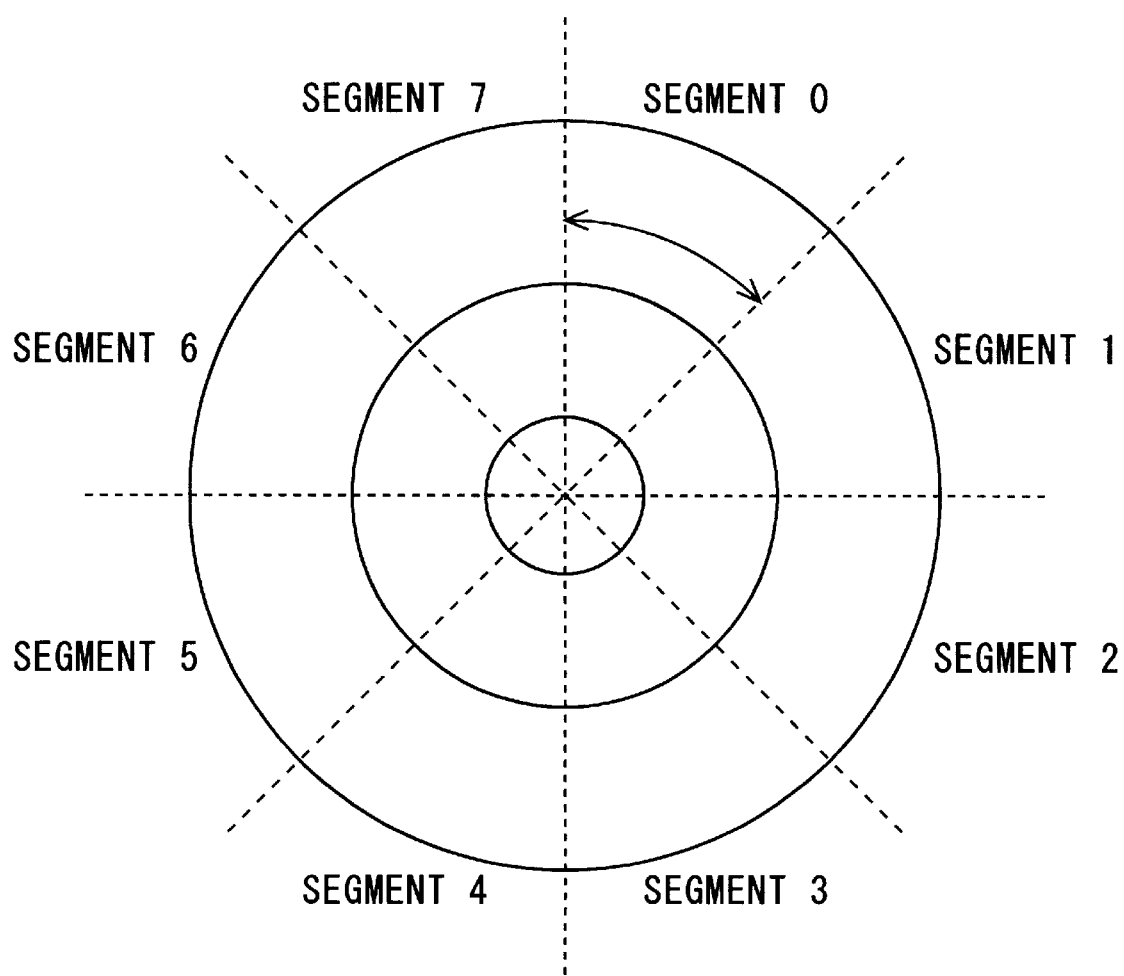
FIG. 2 is a diagram illustrating a wobble address in a DVD+RW disk with 3.0 GB capacity.
Figure 3:
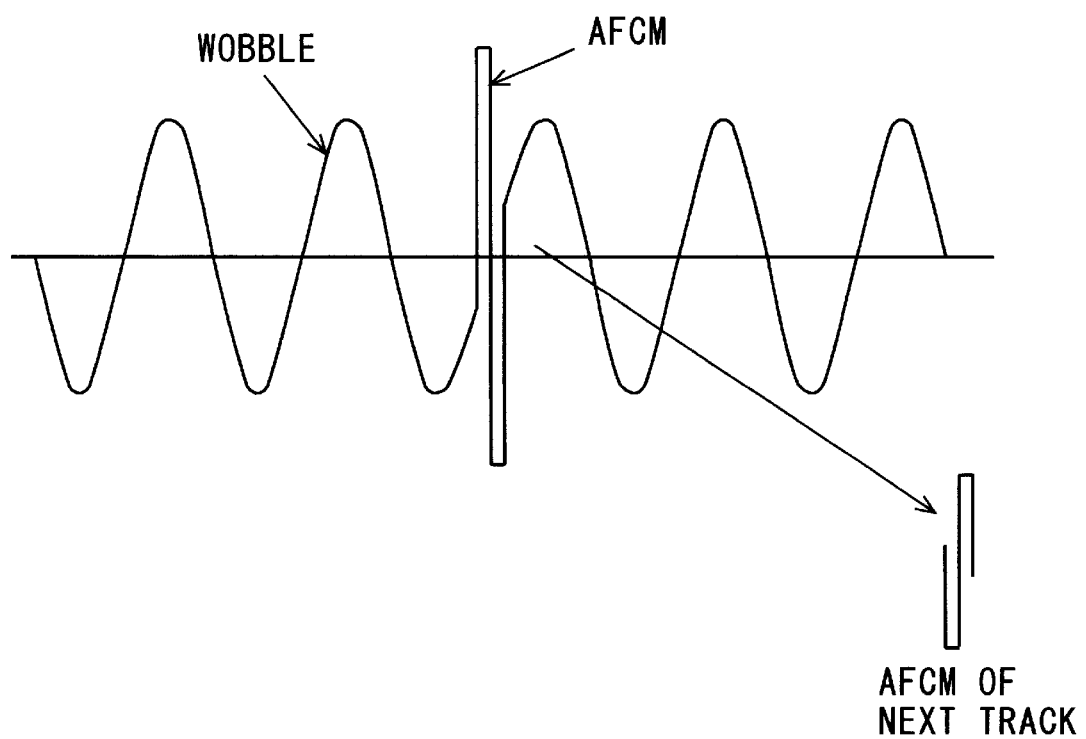
FIG. 3 is a diagram illustrating an AFCM of the DVD+RW disk with 3.0 GB capacity.

Concerning the DVD+RW disc with 3.0 GB capacity, one segment includes one piece of the address information such as track number or segment number, as shown in FIG. 2. The groove wobbles corresponding with a signal given by frequency modulating the address information that has been bi-phase modulated. In the case of the DVD+RW disc with 3.0 GB capacity, each of the AFCMs for obtaining the write clock on the recording is pre-formatted at a predetermined position on the recording track as shown in FIG. 3. These AFCMs are radially arranged with 96 AFCMs being done in a circle. The AFCM inverts its polarity every track.

Concerning the DVD+RW disc with 4.7 GB capacity, one-block area that records one ECC block includes four pieces of the address information (ADIP words). Each bit constituting this address information is modulated inverting some in eight wobble cycles.

Although the groove wobbles corresponding with a signal given by frequency modulating the address information in the case of the DVD+RW disc with 3.0 GB capacity, it wobbles corresponding with a signal given by phase modulation in the case of the DVD+RW disc with 4.7 GB capacity.

FIG. 4A shows a configuration of a sync unit positioned at the top of the ADIP word. FIG. 4B shows a configuration of bit unit with data set to "zero". FIG. 4C shows a configuration of bit unit with data set to "one". In FIGS. 4A through 4C, PW indicates a positive wobble, which means that an advancing direction at the start is directed inwards the disc while NW indicates a negative wobble, which means that an advancing direction at the start is directed outwards the disc.

Referring back to FIG. 1, the drive 100 comprises a spindle motor 103 for spinning the optical disc 102, optical pick-up 104 constituted by a semiconductor laser, objective glass, photo-detector, etc., a feed motor 105 for allowing the optical pick-up 104 to be advanced along a radial direction of the optical disc 102. In connection with the optical disc 102 with 3.0 GB capacity, it spins according to zone Constant Angular Velocity (hereinafter called CAV), while, in connection with the optical disc 102 with 4.7 GB capacity, it spins according to Constant Linear Velocity (hereinafter-called CLV) or the CAV.

The drive 100 also comprises laser driver 106 for controlling emission of the semiconductor laser in the optical pick-up 104, and an RF amplifier 107 for obtaining reproduction RF signal $S_{RF}$, tracking error signal $S_{TE}$, focus error signal $S_{FE}$, and wobble signal $S_{WB}$ corresponding with the wobble of groove by processing output signal from the photo-detector constituting the optical pick-up 104.

The semiconductor laser constituting the optical pick-up 104 projects laser beam of light, not shown in the figures, onto the recording surface of the optical disc 102 irradiating its reflected light onto photo-detector constituting the optical pick-up 104. The RF amplifier 107 generates the tracking error signal $S_{TE}$ based on the DPP method, and the focus error signal $S_{FE}$ based on the astigmatic method. These focus error signal $S_{FE}$ and tracking error signal $S_{TE}$ are supplied to a servo controlling circuit, which will be described later.

The drive 100 further comprises analog signal processor 108 for obtaining playback data PD by processing the reproduction RF signal $S_{RF}$ out of the RF amplifier 107 with waveform equalization, signal detection, etc, and a record compensation circuit 109 for record-compensating record data RD out of digital signal processor, which will be described later, and supplying it to the laser driver 106. The laser beam out of the semiconductor laser of the optical pick-up 104 is modulated with the record data RD thus record-compensated, thereby allowing the record data RD to be recorded on the optical disc 102.

Additionally, the drive 100 comprises the digital signal processor 110. The digital signal processor 110, during the reproduction, performs digital modulation process, error correction process, etc. on the playback data PD out of the analog signal processor 108 and generates read-out data. The digital signal processor 110, during the recording, also performs additional process of parity for error correction process, digital modulation process, etc. on the write data supplied from buffer controller, which will be described later, and generates the record data RD.

The drive 100 still further comprises buffer controller 111 for controlling a data transfer between the digital signal processor 110 and host interface, which will be described later, and the host interface 112 for interfacing with host computer. The host interface 112 receives commands from the host computer and supplies them to the system controller 101. The buffer controller 111, during the reproduction, supplies the read-out data received out of the digital signal processor 110 through RAM 113 as a buffer memory, to the host interface 112 and it, during the recording, supplies the write data supplied from the host interface 112 through RAM 113 to the digital signal processor 110.

The driver 100 additionally comprises the servo controlling circuit 114. The servo controlling circuit 114 controls focus and/or tracking in the optical pick-up 104 and operations of the feed motor 105.

The drive 100 further comprises an ADIP decoder 115 for generating address information AD by processing the wobble signal $S_{WB}$ received from the RF amplifier 107. The address information AD generated by the ADIP decoder 115 is supplied to the system controller 101, which employs it for various controls.

It also comprises a WCK generator 116 (116A and 116B) for generating write clock WCK to be used for the recording. The wobble signal $S_{WB}$ out of the RF amplifier 107 is supplied to the WCK generator 116, which usually generates the write clock WCK using this wobble signal $S_{WB}$. The write clock WCK generated by the WCK generator 116 is supplied to the system controller 101 and other necessary portions, not shown in the drawings.

Figure 5:
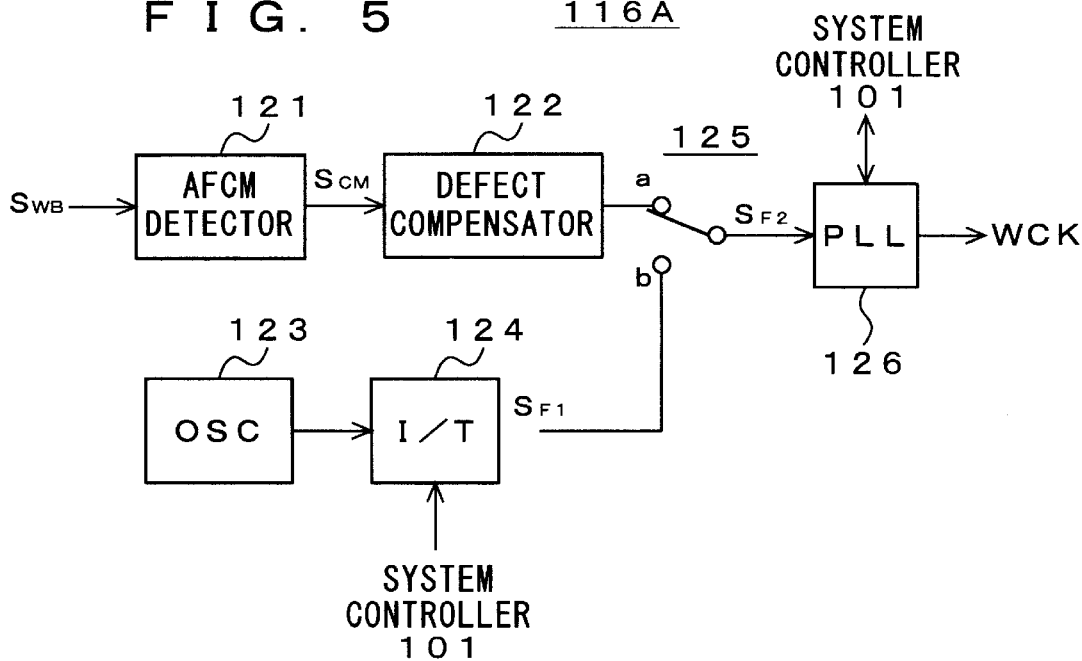
FIG. 5 is a block diagram illustrating a configuration of WCK generator.

FIG. 5 shows a configuration of the WCK generator 116A used in the case that the optical disc 102 is the DVD+RW disc with 3.0 GB capacity.

The WCK generator 116A comprises an AFCM detector 121 for generating from the wobble signal $S_{WB}$ a clock mark detecting signal $S_{CM}$ corresponding with the above AFCM, and a defect compensator 122 for compensating lack portion by defect, if any, in the clock mark detecting signal $S_{CM}$ generated by the AFCM detector 121.

The WCK generator 116A also comprises crystal oscillator 123, demultiplier 124 for demultiplying frequency signal received from the crystal oscillator 121 by T, and circuit changing switch 125 for selecting the clock mark detecting signal $S_{CM}$ output from the defect compensator 122 or frequency signal $S_{F1}$ output from the demultiplier 124 and delivering it.

In the shown case, the changing switch 125 is usually switched and connected to "a" point to select the clock mark detecting signal $S_{CM}$ and deliver it while the switch 125 is switched and connected to "b" point to select the frequency signal $S_{F1}$ and deliver it when Phase-Locked Loop (hereinafter called PLL) is rendered unlock condition corresponding with a block area in the optical disc 102 so that no correct write clock WCK occurs, which will be described more in detail, and the replacement procedure is performed on this block area to write the data on the block area. The system controller 101 controls a demultiplied ratio of the demultiplier 124 and/or switching operation of the changing switch 125.

The WCK generator 116A further comprises PLL circuit 126 for receiving frequency signal $S_{F2}$ delivered from the changing switch 125, and generating the write clock WCK having M-fold frequency thereof with it synchronizing with the frequency signal $S_{F2}$. The system controller 101 controls the multiplication rate M in this PLL circuit 126 and receives information (lock information) for determining whether it is lock condition or unlock condition from the PLL circuit 126.

As described above, the DVD+RW disc with 3.0 capacity may spin according to the zone CAV method. It is necessary to write the data on this DVD+RW disc with 3.0 capacity according to Constant Linear Density (hereinafter called CLD) method as the DVD-ROM disc. Therefore, the multiplication rate M in the PLL circuit 126 rises gradually in every zone with it moving from the inner radius of the disc toward the outer radius thereof.

Frequencies of the clock mark detecting signal $S_{CM}$ obtained in every zone are different from each other because the DVD+RW disc with 3.0 capacity spins according to the zone CAV method. The demultiplied ratio (1/T) of the demultiplier 124 is set so that when performing the replacement procedure on a block area to write the data on the block area, the frequency signal $S_{F1}$ having the same frequency as the clock mark detecting signal $S_{CM}$ obtained in the zone including the block area has can be generated. In this case, where rotation number of the disc is N [rpm], frequency F1 of the frequency signal $S_{F1}$ is calculated as follows:

$$F1 = N \times 96/60 \text{ [Hz]}$$

Figure 6:
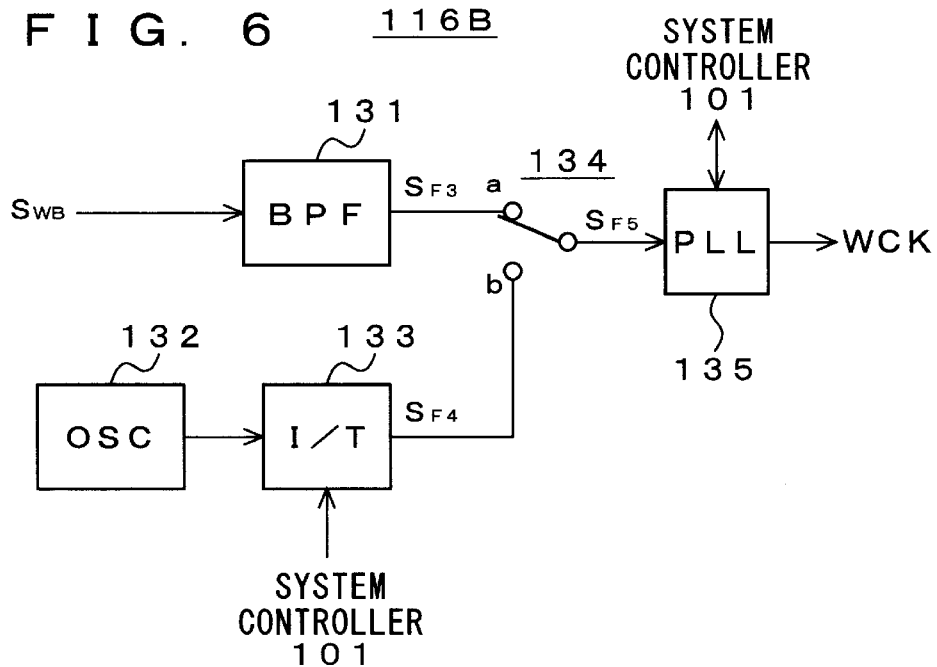
FIG. 6 is a block diagram illustrating a configuration of WCK generator.

FIG. 6 shows a configuration of the WCK generator 116B used in the case that the optical disc 102 is the DVD+RW disc with 4.7 GB capacity.

The WCK generator 116B comprises band pass filter 131 for extracting and passing frequency signal $S_{F3}$ corresponding with the wobble from the wobble signal $S_{WB}$, crystal oscillator 132, demultiplier 133 for demultiplying frequency signal received from the crystal oscillator 132 by T, and circuit changing switch 134 for selecting the frequency signal $S_{F3}$ output from the band pass filter 131 or frequency signal $S_{F4}$ output from the demultiplier 133 and delivering it.

In the shown case, the changing switch 134 is usually switched and connected to "a" point to select the frequency signal $S_{F3}$ and deliver it while the switch 134 is switched and connected to "b" point to select the frequency signal $S_{F4}$ and deliver it when PLL (Phase-Locked Loop) is rendered unlock condition corresponding with a block area in the optical disc 102, which will be described more in detail, so that no correct write clock WCK occurs, and the replacement procedure is performed on this block area to write the data on the block area. The system controller 101 controls a demultiplied ratio of the demultiplier 133 and/or switching operation of the changing switch 134.

The WCK generator 116B further comprises PLL circuit 135 for receiving frequency signal $S_{F5}$ delivered from the changing switch 134, and generating the write clock WCK having 32-fold frequency thereof with it synchronizing with the frequency signal $S_{F5}$. The system controller 101 receives information (lock information) for determining whether it is lock condition or unlock condition from the PLL circuit 135.

Since the wobble of groove has a constant wave length in the DVD+RW disc with 4.7 GB capacity, the multiplication rate in this PLL circuit 135 is fixed to 32-fold. Thus, when this DVD+RW disc spins according to the CLV method, the frequency of the write clock WCK is fixed while, when this DVD+RW disc spins according to the zone CAV method, the frequency of the write clock WCK rises in every zone with it moving from the inner radius of the disc toward the outer radius thereof.

The demultiplied ratio (1/T) of the demultiplier 133 is set so that when performing the replacement procedure on a block area to write the data on the block area, the frequency signal $S_{F4}$ having the same frequency as the frequency signal $S_{F3}$ obtained in the block area has can be generated. In this case, where using the zone CAV method, the frequency signal $S_{F4}$ has frequency that is proportional to a radius of disc in each zone. The radius may be calculated on the address so that the system controller 101 can calculate the demultiplied ratio (1/T).

Next, the operations of the optical disc drive 100 shown in FIG. 1 will be described.

When the host computer supplies a data write command to the system controller 101 through the host interface 112, data write operation (recording) is carried out. In this case, the write data transferred from the host computer is supplied to the digital signal processor 110 through the host interface 112 and the buffer controller 111. The digital signal processor 110 generates the record data RD with performing the additional process of parity for error correction process, digital modulation process, etc. on the write data.

The record data RD is then record-compensated in the record compensation circuit 109, which is supplied to the laser driver 106. Therefore, the laser beam out of the semiconductor laser of the optical pick-up 104 is modulated with the record data RD thus record-compensated, thereby allowing the record data RD to be recorded on the optical disc 102. During the recording, the write clock WCK generated by the WCK generator 116 is used.

Next, when the host computer supplies a data read command to the system controller 101 through the host interface 112, data read operation (reproduction) is carried out. The analog signal processor 108 generates the playback data PD with performing the process such as the wave form equalization on the reproduction RF signal reproduced by the optical pick-up 104. The playback data PD is then supplied to the digital signal processor 110. The digital signal processor 110 generates read-out data with performing the digital modulation process, the error correction process, etc. on the playback data PD.

The read-out data generated by the digital signal processor 110 is transferred to the host computer with a predetermined timing through the buffer controller 111 and the host interface 112.

Figure 7:
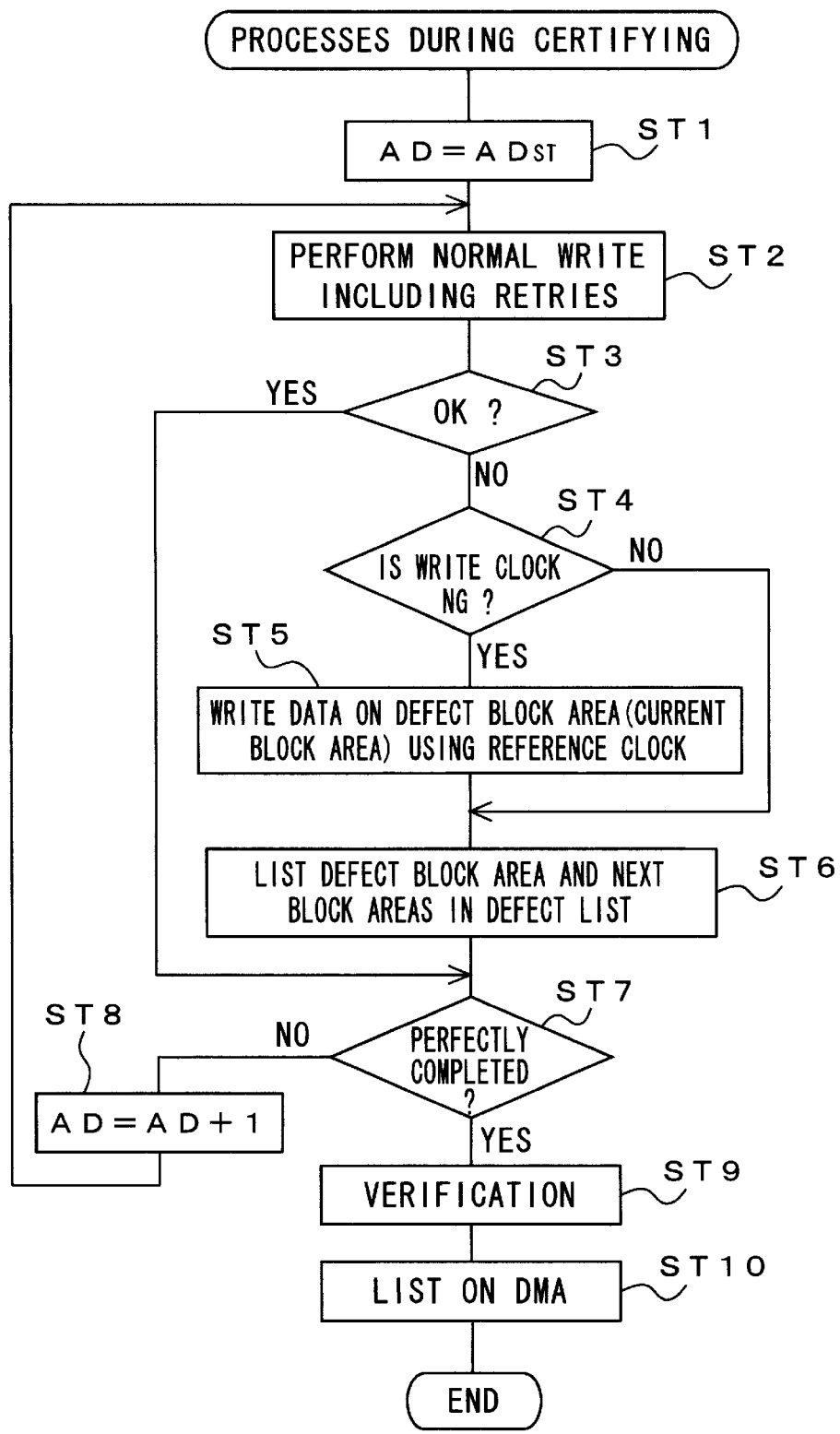
FIG. 7 is a flow chart illustrating the processes during the certification.

Referring to FIG. 7, the processes performed by the system controller 101 during certification will be described.

At Step 1, address AD is initially set to a start address $AD_{ST}$. Here, the address AD indicates each of the block areas in the optical disc 102, each area allowing the data of one ECC block to be written.

At Step 2, then, normal writing including the retries on the block area of optical disc 102 corresponding with the address AD is carried out. In this case, where the WCK generator 116A shown in FIG. 5 is used, the changing switch 125 is switched and connected to "a" point and the PLL circuit 126 generates the write clock WCK according to the clock mark detecting signal $S_{CM}$ for using it therein.

Where the WCK generator 116B shown in FIG. 6 is used, the changing switch 134 is switched and connected to "a" point and the PLL circuit 135 generates the write clock WCK according to the frequency signal $S_{F3}$ corresponding with the wobble for using it therein. The write clock WCK in this case is generated so as to be correctly adapted for nonuniform rotation of the optical disc 102, etc.

At Step 3, it is determined whether the data is correctly written on the block area (current block area) corresponding with the address AD. When no write clock WCK occurs correctly if the PLL of the WCK generator 116 is illustratively unlocked, it stops writing the data on the block area. If the correct data writing is unavailable, then it is determined whether this results from that no write clock WCK occurs correctly, at step 4.

If this results from that no write clock WCK occurs correctly, then the data is written on the defect block area (current block area) using the reference clock, at Step 5. Where the WCK generator 116A shown in FIG. 5 is used, the reference clock in this case is the write clock WCK generated when the changing switch 125 is switched and connected to "b" point while where the WCK generator 116B shown in FIG. 6 is used, it is the write clock WCK generated when the changing switch 134 is switched and connected to "b". The data to be written on the defect block area may be the data to be normally written on this block area or any other optional data.

At Step 6, the defect block area (current block area) and next block area are listed in the defect list, and then the process goes to Step 7. If this does not result from that no write clock WCK occurs correctly, at the above Step 4, then the process directly goes to Step 6 wherein the defect block area (current block area) and its next block area are listed in the defect list, and then the process goes to Step 7. Alternatively, if the data is correctly written on the current block area at Step 3, then the process directly goes to Step 7.

At Step 7, it is determined whether perfect certification on the optical disc 102 has completed. If not completed, then the address AD is incremented at Step 8, the process goes back to Step 2 and the same processes as the above are repeated. Thus, normal writing on the next block area following the defect block area is available. If completed at Step 7, it is verified at Step 9 and then, at Step 10, the defect block area is listed in the DMA of the optical disc 102, the replacement procedure is performed and the process is completed.

In the above case, the slip replacement is performed on the DVD+RW disc with 3.0 GB capacity. In this case, as shown in FIG. 8, the defect block area and its next block area are listed in the PDL as the defect area, and the process is so performed that the data to be written on these block areas can be written on the subsequent block areas physically following these block areas.

On the other hand, the linear replacement is performed on the DVD+RW disc with 4.7 GB capacity. In this case, as shown in FIG. 9, the defect block area and its next block area are listed in the RPL as the defect area and the process is so performed that the data to be written on these block areas can be written on the replacement area.

Figure 8:
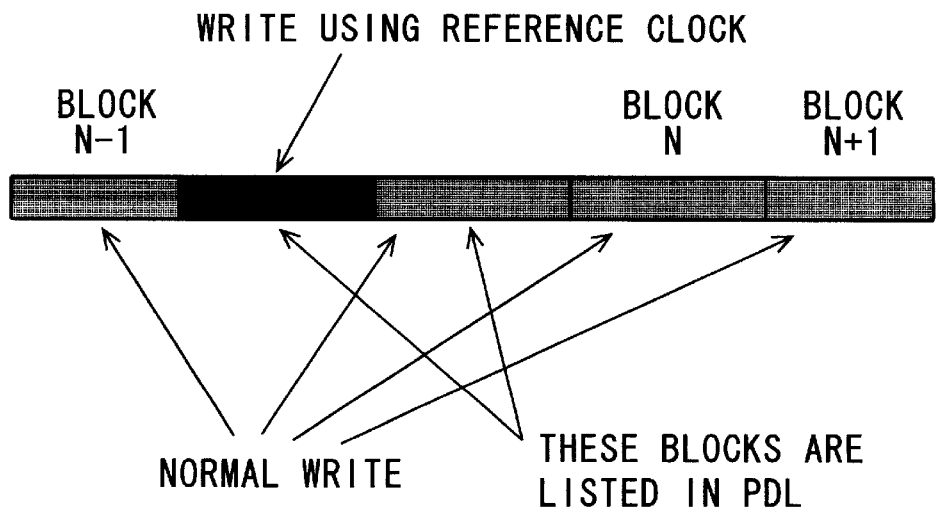
FIG. 8 is a diagram illustrating slip replacement procedures.
Figure 9:
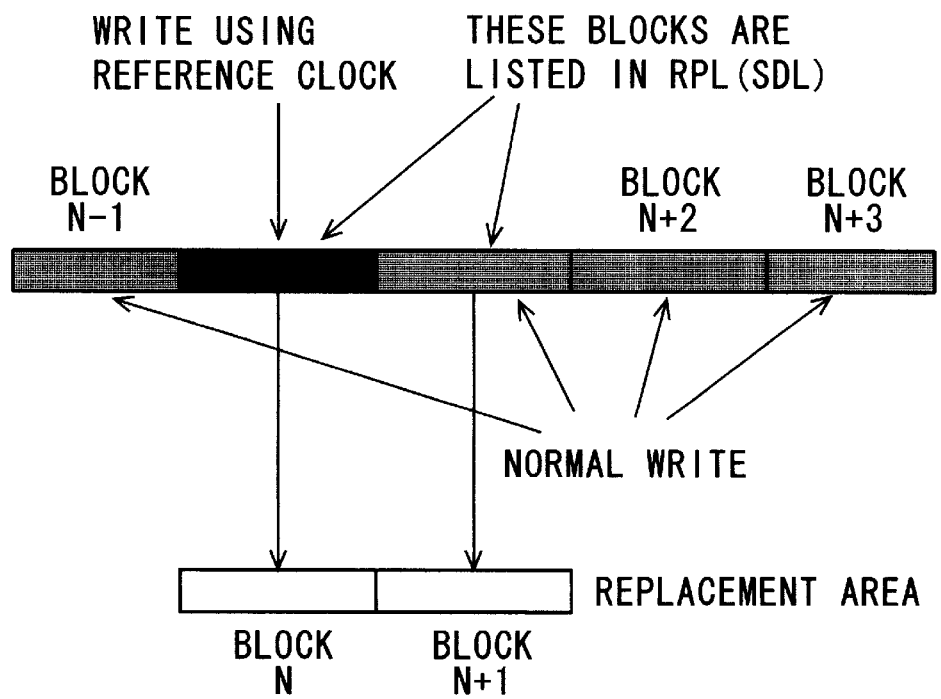
FIG. 9 is a diagram illustrating linear replacement procedures.
Figure 14:
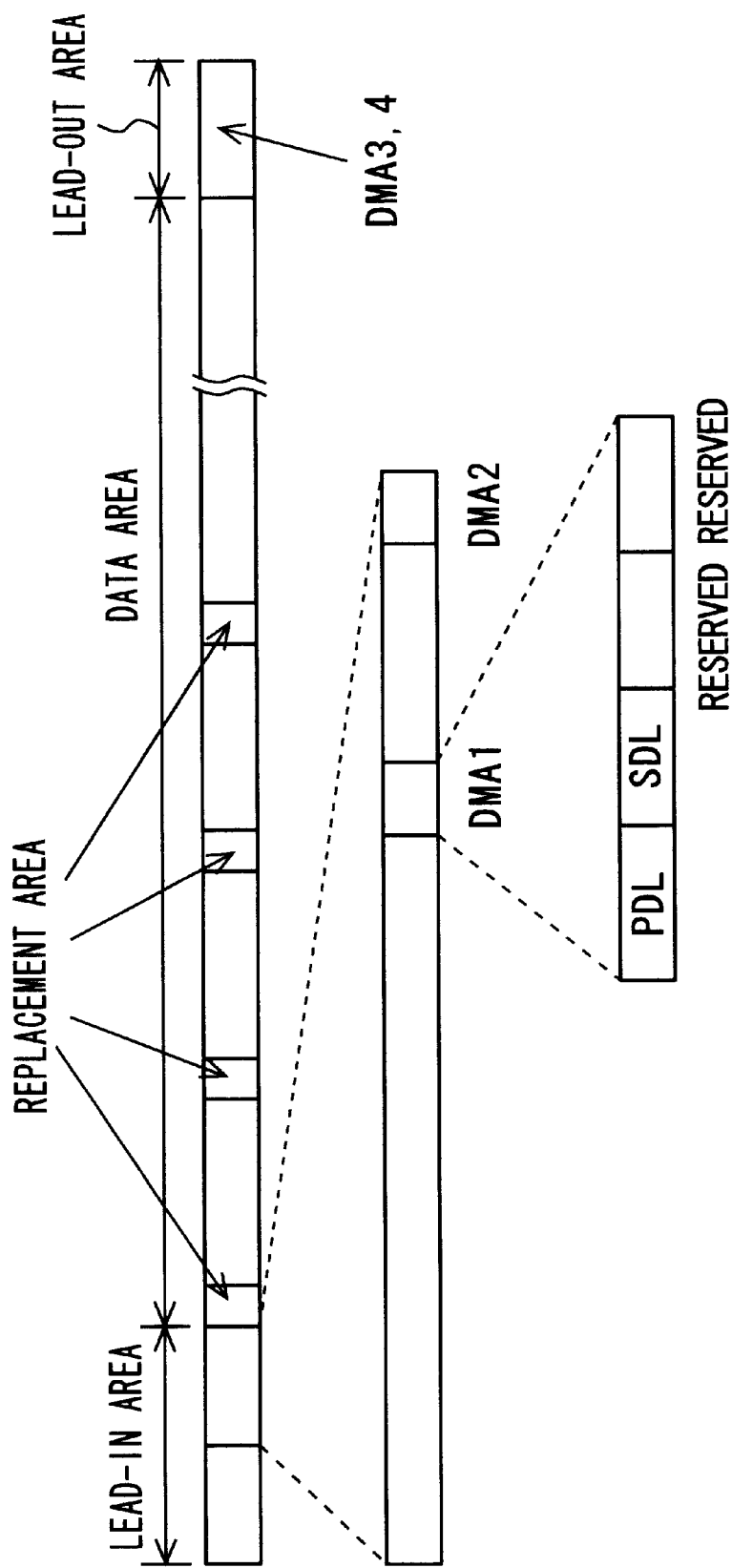
FIG. 14 is a diagram illustrating a format of the DVD+RW disk with 3.0 GB capacity.
Figure 15:
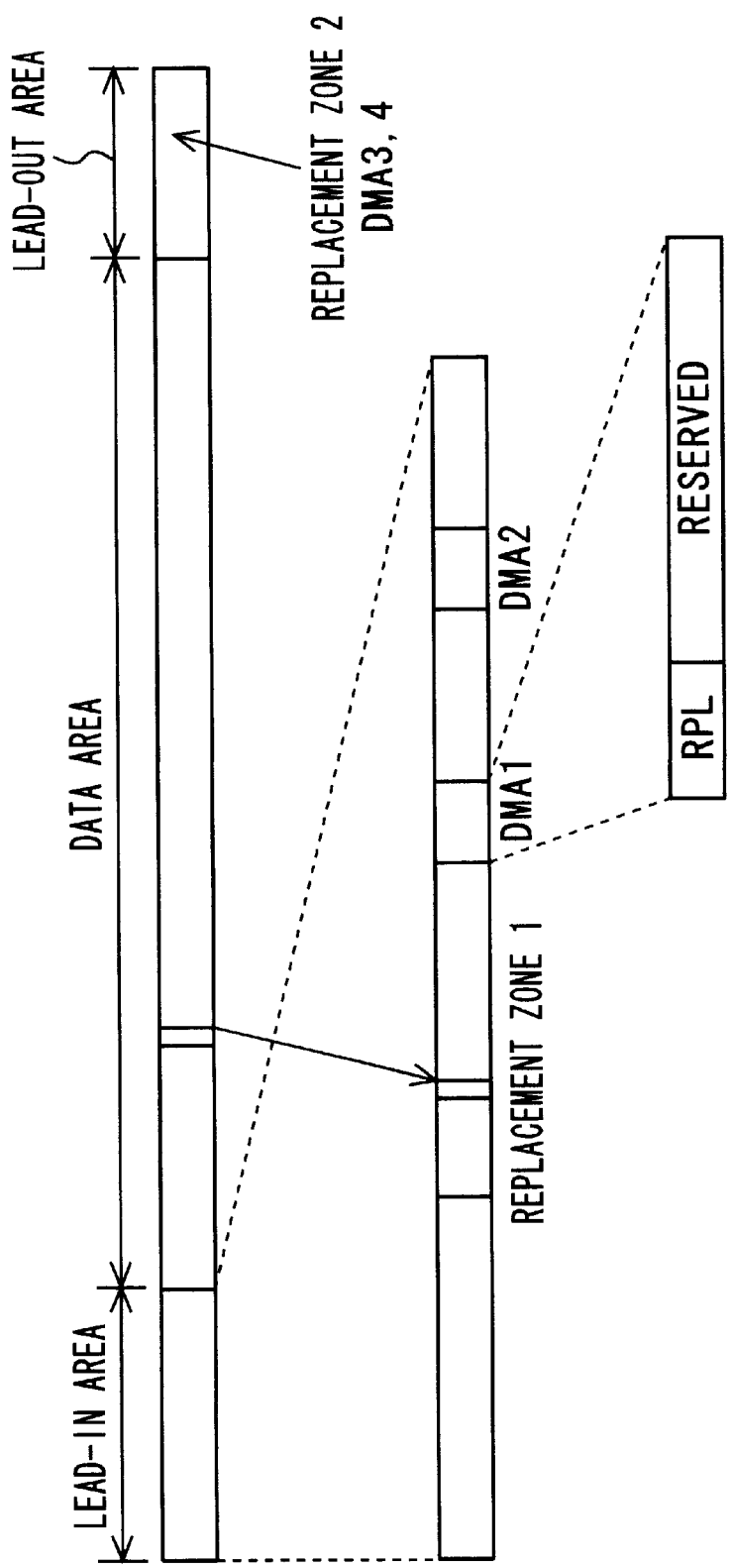
FIG. 15 is a diagram illustrating a format of the DVD+RW disk with 4.7 GB capacity.

Each of the words, "normal writes" shown in FIGS. 8 and 9 means writing the data using the write clock WCK generated when the changing switches 125 and 134 of the WCK generators 116A and 116B shown in FIGS. 5 and 6 are switched and connected to "a" point, respectively.

Referring to FIG. 10, the processes performed by the system controller 101 during normal writing will be described.

At Step 21, the normal writing including the retries is initially carried out. In this case, where the WCK generator 116A shown in FIG. 5 is used, the changing switch 125 is switched and connected to "a" point and the PLL circuit 126 generates the write clock WCK according to the clock mark detecting signal $S_{CM}$ for using it therein. Where the WCK generator 116B shown in FIG. 6 is used, the changing switch 134 is switched and connected to "a" point and the PLL circuit 135 generates the write clock WCK according to the frequency signal $S_{F3}$ corresponding with the wobble for using it therein. The write clock WCK in this case is generated so as to be correctly adapted for nonuniform rotation of the optical disc 102, etc.

In this case, the data is written on the block area corresponding with the target address. Here, the address indicates each of the block areas in the optical disc 102, each area allowing the data of one ECC block to be written.

At Step 22, it is then determined whether the correct data writing is available. When no write clock WCK occurs correctly if the PLL of the WCK generator 116 is illustratively unlocked, it stops writing the data. If the correct data writing is available, the process is completed.

At Step 23, if the correct data writing is unavailable, then it determines a replacement location where the defect block area failing to write the data correctly is replaced and the location is listed. At Step 24, it is determined whether failing to write the data correctly on the defect block area results from that no write clock WCK occurs correctly. If it results from that no write clock WCK occurs correctly, then the data is written on the defect block area (current block area) using the reference clock, at Step 25. Where the WCK generator 116A shown in FIG. 5 is used, the reference clock in this case is the write clock WCK generated when the changing switch 125 is switched and connected to "b" point while where the WCK generator 116B shown in FIG. 6 is used, it is the write clock WCK generated when the changing switch 134 is switched and connected to "b". The data to be written on the defect block area may be the data to be normally written on this block area or any other optional data.

After processing at Step 25, the process goes to Step 26. If it does not result from that no write clock WCK occurs correctly at the above Step 24, then the process directly goes to Step 26. At Step 26, the data to be written on the defect block area is written on the replacement location.

At Step 27, then, it determines a replacement location where the next block area following the defect block area is replaced and this replacement location is listed. At Step 28, then, read-out from the next block area is carried out, and at Step 29, it determines whether this block is a blank. If it is the blank, then dummy data is written thereon at Step 30 and then the process goes to Step 31. On the other hand, if it is not the blank, the process directly goes to Step 31. When the certification process described above is carried out, no blank occurs.

At step 31, the data written on the above next block area is copied in the replacement location. When the next block area is the blank and the dummy data is written thereon as described above, the dummy data is also written on the replacement location. If the next block area has been replaced at Step 27, the processes at Steps 27 through 31 are omitted.

At Step 32, DMA in the optical disc 102 is updated and the process is completed. Since the replacement process during normal writing is linear replacement process, the DVD+RW disc with 3.0 GB capacity has SDL listing the defect block area and the next block area following it as the defect area while the DVD+RW disc with 4.7 GB capacity has RPL listing the defect block area and the next block area following it as the defect area.

When no write clock WCK occurs correctly if the data is written on a block area (block area A), it stops writing the data on the block area. FIG. 11A shows a case where it stops writing the data at point P.

When it stops writing the data on the block area A in such a manner, the data is written on the block area A using the reference clock, as described above. Since the reference clock is not correctly adapted for corresponding with non-uniform rotation of the optical disc 102, etc., a blank portion threatens to remain in a rear side of the block area A if a predetermined amount of data to be written on the block area A is written thereon.

If a blank portion remains, this cause the tracking servo failure in the block area A. Thus, according to this embodiment, the data to be written is increased when the data is written on the block area A using the reference clock so that the data can be written on the block area A+1 across the block area A, the block area A+1 following the block area A as shown in FIG. 11B, which has not described before. Alternatively, this may be attained by making a frequency of the reference clock lowered instead of increasing an amount of the data to be written.

Thus, if the data is written on the block area A+1 across the area A, this brings no question because normal write is performed on the block area A+1 as shown in FIG. 11C so that a portion Q written using the reference clock can be overwritten thereby.

As described above, according to the embodiments of this invention, when no write clock WCK occurs correctly if the data is written on a predetermined block area of the optical disc 102, it stops writing the data on the predetermined block area (defect block area) and the replacement process is performed on the predetermined block area as well as the data is then written on the predetermined block area using a reference clock based on frequency signal from the crystal oscillator. Therefore, if the replacement process is performed on the predetermined block area of the optical disc 102, it prevents the predetermined block area from generating blank portion therein, so that when the DVD-ROM drive illustratively reproduces the data from the optical disc 102, it can prevent the disadvantage such as tracking servo failure in the above predetermined block area.

According to the above embodiments of this invention, normal write is performed on the next block area of the optical disc 102 following the predetermined block area (defect block area) on which the data is written using the reference clock, but the replacement process is also performed on the next block area. Such the replacement process on the next block area allows the data to be retrieved from the replacement location even when clock component of the reproduction RF signal is interrupted at a boundary between the predetermined block area and the next block area following it so that reproduction clock (read clock) can not be correctly generated.

Normal writing on the next block area when the replacement process is performed on the next block area allows the next block area and the subsequent block area following it to be uninterrupted, thereby bringing about the reproduction clock correctly in the subsequent block areas and allowing the data to be correctly read-out of the subsequent block areas.

According to the above embodiment of this invention, when data is written on a predetermined block area (defect block area) using reference clock, the data is written on the next block area across the predetermined block area, the next block area following the predetermined block area. This prevents blank portion from remaining in a rear side of the predetermined block area, so that, when the DVD-ROM drive illustratively reproduces the optical disc 102, no tracking servo failure can occur in the predetermined block area and the data can be read from the following block areas.

Although this invention has been applied to the optical disc drive 100 handling with the DVD+RW disc in the above embodiments, it is, of course, also applicable to other optical disc drive wherein the data is written on the optical disc on a block unit basis using the write clock generated on the basis of the information given by the optical disc.

According to this invention, the data recording method for recording the data on the optical disc on a block unit basis using the write clock generated on the basis of the information given by the optical disc, comprises a step of performing replacement procedures on a first block area of the optical disc on which a predetermined block of data is to be recorded, when no write clock corresponding to the first block area occurs, and a step of recording predetermined data on the first block area using a reference clock that is different from the write clock, thereby preventing the first block area from generating blank portion therein when performing replacement procedures on the first block area, and preventing the disadvantage such as tracking servo failure in the first block area when the optical disc is reproduced.

According to this invention, when the replacement process is performed on the first block area and the data is written on the first block area using the reference clock, the replacement process is also performed on second block area following the first block area, so that it allows the data to be retrieved from the replacement location even when clock component of the reproduction RF signal is interrupted at a boundary between the first block area and the second block area so that reproduction clock (read clock) can not be correctly generated because of the interruption of clock component of the reproduction RF signal.

According to this invention, when the replacement process is performed on the second block area, it carries out a normal writing on the second block area, thereby allowing the clock component of the reproduction RF signal between the second block area and third block area following it to be uninterrupted, bringing about the reproduction clock correctly at the third block area, and allowing the data to be correctly read-out of the third block area.

According to this invention, when data is written on the first block area (defect block area) of the optical disc using reference clock, the data is written on second block area across the first block area, the second block area following the first block area, thereby preventing blank portion from remaining in a rear side of the first block area, so that, when the optical disc is reproduced, it can avoid the disadvantage such as the tracking servo failure occurred in the first block area.

INDUSTRIAL APPLICABILITY

As described above, a data recording method and a data recording apparatus according the this invention are preferably applicable to a case where it records the data on an optical disc such as DVD+RW disc.

What is claimed is:

1. A data recording method for recording data on an optical disc on a block unit basis using write clock generated on the basis of information given by the optical disc, comprising steps of:

performing a replacement procedure on a first block area of said optical disc on which a predetermined block of data is to be recorded, when the write clock corresponding to the first block area fails to be correctly generated; and recording predetermined data on said first block area using a reference clock that is different from said write clock.

2. The data recording method according to claim 1, wherein the predetermined data is recorded on a second block area following said first block area using said write clock when performing the replacement procedure on said first block area, and the replacement procedure is performed on said second block area.

3. The data recording method according to claim 1, wherein said predetermined data is recorded on a second block area across said first block area, when recording the data on said first block area using said reference clock, said second block area following said first block area.

4. The data recording method according to claim 1, wherein the information given by said optical disc includes reproduction information for a groove wobble in said optical disc.

5. The data recording method according to claim 1, wherein the information given by said optical disc includes reproduction information for a clock mark formed along the groove wobble in said optical disc.

6. The data recording method according to claim 1, further comprising a step of recording information indicating that said first block area has been replaced, on defect management area set in said optical disc.

7. A data recording apparatus comprising:

write clock generating means for generating write clock on the basis of information given by an optical disc;

data recording means for recording data on a block unit basis using said write clock generated by said write clock generating means;

reference clock generating means for generating reference clock that is different from said write clock; and processing means for performing a replacement procedure on a first block area of the optical disc on which a predetermined block of said data is to be recorded, when said write clock generating means fails to generate said write clock corresponding to the first data block area correctly, and allowing said data recording means to record predetermined data on said first block area using said reference clock generated by said reference clock generating means.

8. The data recording apparatus according to the claim 7 wherein said processing means allows said data recording means to record the predetermined data on a second block area following said first block area using said write clock generated by said write clock generating means when performing the replacement procedure on said first block area, and performs the replacement procedure on said second block area.

9. The data recording apparatus according to the claim 7 wherein said processing means allows said data recording means to record the predetermined data on a second block area across said first block area, said second block area following said first block area, when recording said predetermined data on said first block area using said reference clock.

10. The data recording apparatus according to the claim 7, wherein the information given by said optical disc includes reproduction information for a groove wobble in said optical disc.

11. The data recording apparatus according to the claim 7, wherein the information given by said optical disc includes reproduction information for a clock mark formed along the groove wobble in said optical disc.

12. The data recording apparatus according to the claim 7, wherein said processing means allows said data recording means to record information indicating that said first block area has been replaced, on defect management area set in said optical disc.

13. A data recording apparatus comprising:

write clock generating means for generating write clock on the basis of information given by reflected light from an optical disc;

data recording means for recording data using said write clock generated by said write clock generating means;

reference clock generating means for generating reference clock that is different from said write clock; and processing means for allowing the data recording means to record predetermined data on said first block area using said reference clock generated by said reference clock generating means when the write clock generating means fails to generate the write clock correctly, corresponding to said first block area of said optical disc on the basis of the information given by the reflected light from the optical disc, during certifying process.

14. The data recording apparatus according to the claim 13 wherein said processing means allows said data recording means to record said predetermined data on a second block area across said first block area, said second block area following said first block area, when recording said predetermined data on said first block area using said reference clock.

15. The data recording apparatus according to the claim 13, wherein the information given by said optical disc includes reproduction information for a groove wobble in said optical disc.

16. The data recording apparatus according to the claim 13, wherein the information given by said optical disc includes reproduction information for a clock mark formed along the groove wobble in said optical disc.

17. The data recording apparatus according to the claim 13, wherein said processing means performs a replacement procedure on said first block area, and allows said data recording means to record information indicating that said first block area has been replaced, on defect management area set in said optical disc.

* * * * *